(12) United States Patent
Seely et al.

(10) Patent No.: US 7,533,789 B1
(45) Date of Patent: May 19, 2009

(54) SPARE TIRE MOUNTING APPARATUS

(76) Inventors: Stephen J. Seely, 332 Chickasaw La., Yukon, OR (US) 73099; Sally J. Seely, 332 Chickasaw La., Yukon, OK (US) 73099

( * ) Notice: Subject to any disclaimer, the term of this patent is extended or adjusted under 35 U.S.C. 154(b) by 428 days.

(21) Appl. No.: 11/531,833

(22) Filed: Sep. 14, 2006

Related U.S. Application Data

(63) Continuation-in-part of application No. 10/699,339, filed on Nov. 3, 2003, now abandoned.

(51) Int. Cl.
*B60R 9/00* (2006.01)
*B60R 7/00* (2006.01)
*B62D 43/00* (2006.01)

(52) U.S. Cl. .............. 224/42.12; 224/519; 224/525; 224/531; 224/521; 224/282; 224/42.13

(58) Field of Classification Search .......... 224/42.12, 224/519, 525, 531, 502, 42.13, 282, 503, 224/521, 42.42; 211/23, 13.1; 280/152.05; 70/259
See application file for complete search history.

(56) References Cited

U.S. PATENT DOCUMENTS

| | | | | |
|---|---|---|---|---|
| 2,772,826 A | * | 12/1956 | Krengel | .................. 224/42.24 |
| 3,779,580 A | | 12/1973 | Thelen | |
| 4,484,699 A | | 11/1984 | Heck | |
| 4,561,575 A | * | 12/1985 | Jones | .................. 224/42.21 |
| D293,229 S | | 12/1987 | Smith | |
| 5,370,285 A | | 12/1994 | Steelman | |
| 5,469,998 A | * | 11/1995 | Van Dusen et al. | .......... 224/506 |
| 5,850,959 A | * | 12/1998 | Miller | .................. 224/535 |
| 6,089,431 A | * | 7/2000 | Heyworth | .................. 224/521 |

* cited by examiner

*Primary Examiner*—Nathan J Newhouse
*Assistant Examiner*—Lester L Vanterpool

(57) ABSTRACT

A spare tire mounting apparatus includes a mounting including a male hitch coupler and a female hitch coupler that are attached together. The male hitch coupler may be extended into and secured to the receiver hitch. A pole is attached to and extends upwardly from the mounting. The pole has a front side and a back side. The pole has a break therein such that a first portion and a second portion are defined. The first portion abuts the mounting and is hingedly coupled to the second portion. The hinge is positioned on the front side of the pole. A rod for removably receiving a tire is attached to the pole and extends outwardly away from the front side of the pole. The rod is positioned on the second portion of the pole. The rod is threaded and a threaded locking member is selectively positionable on the rod.

6 Claims, 2 Drawing Sheets

SPARE TIRE MOUNTING APPARATUS

CONTINUATION IN PART

This file is a continuation in part of application Ser. No. 10/699,339 filed on Nov. 11th, 2003.

BACKGROUND OF THE INVENTION

1. Field of the Invention

The present invention relates to tire mounting devices and more particularly pertains to a new tire mounting device for supporting a spare tire on a receiver hitch of a vehicle.

2. Description of the Prior Art

The use of tire mounting devices is known in the prior art. While these devices fulfill their respective, particular objectives and requirements, the need remains for a device that allows a person to mount a spare tire on a receiver hitch so that the spare tire does not occupy the majority of space found within a pick-up bed.

SUMMARY OF THE INVENTION

The present invention meets the needs presented above by generally comprising a mounting including a male hitch coupler and a female hitch coupler that are attached together. The male hitch coupler may be extended into and secured to the receiver hitch such that the female hitch coupler extends away from the receiver hitch. A pole is attached to and extends upwardly from the mounting. The pole has a front side and a back side. The pole has a break therein such that a first portion and a second portion are defined. The first portion abuts the mounting and is hingedly coupled to the second portion. The hinge is positioned on the front side of the pole. A rod for removably receiving a tire is attached to the pole and extends outwardly away from the front side of the pole. The rod is positioned on the second portion of the pole. The rod is threaded and a threaded locking member is selectively positionable on the rod.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
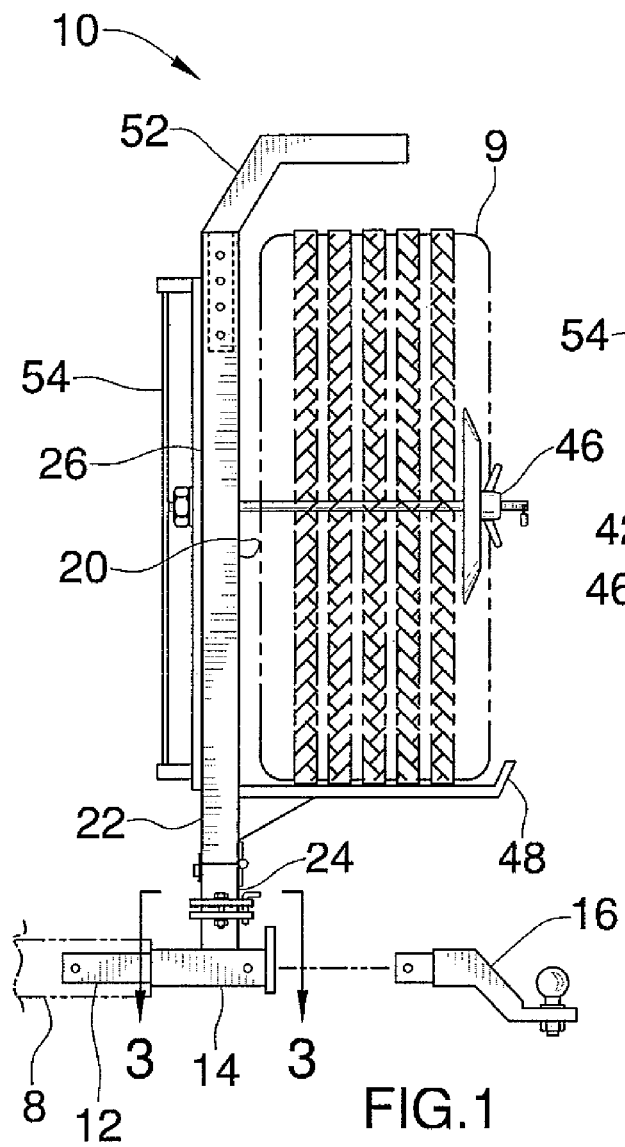
FIG. 1 is a schematic side view of a spare tire mounting apparatus according to the present invention.
Figure 2:
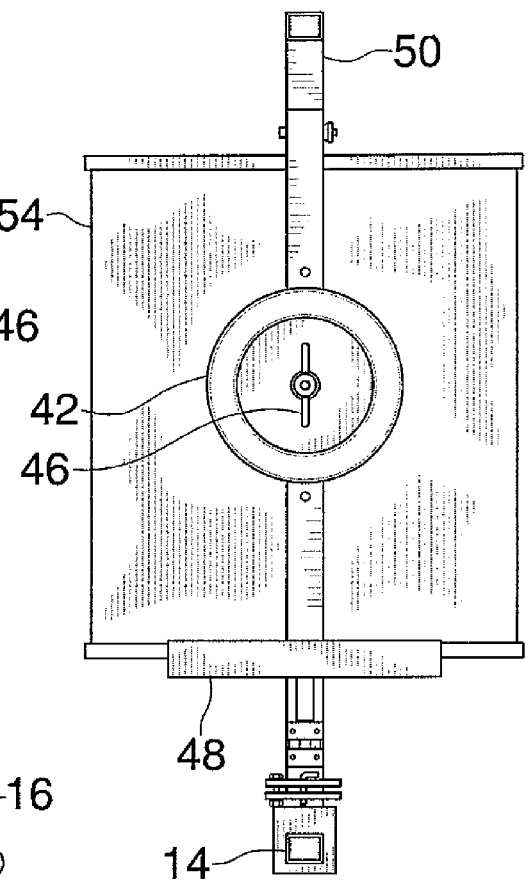
FIG. 2 is a schematic front view of the present invention.
Figure 3:
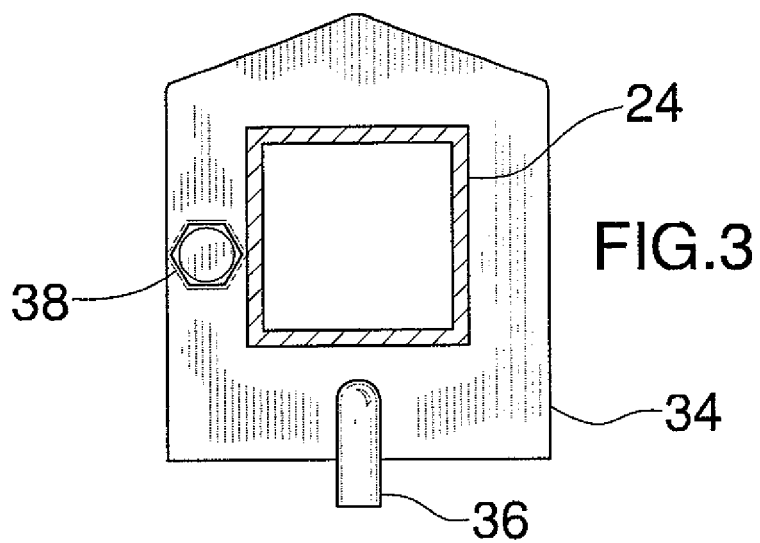
FIG. 3 is a schematic cross-sectional view taken along line 3-3 of FIG. 1 of the present invention.

With reference now to the drawings, and in particular to FIGS. 1 through 4 thereof, a new tire mounting device embodying the principles and concepts of the present invention and generally designated by the reference numeral 10 will be described.

As best illustrated in FIGS. 1 through 4, the spare tire mounting apparatus 10 generally comprises a mounting including a male hitch coupler 12 and a female hitch coupler 14 that are attached together. The male hitch coupler 12 may be extended into and secured to a vehicle receiver hitch 8 such that the female hitch coupler 14 extends away from the receiver hitch 8. The female hitch coupler 14 is adapted for receiving a male hitch from a trailer or a ball hitch assembly 16.

A pole 18 is attached to and extends upwardly from the mounting 12. The pole 18 has a front side 20 and a back side 22. The pole 18 has a break therein such that a first portion 24 and a second portion 26 are defined, wherein the first portion 24 abuts the mounting. The first portion 24 is hingedly coupled to the second portion 26 by a hinge 28. The hinge 28 is positioned on the front side 20 of the pole 18 so that the second portion 26 may be extended away from the vehicle for the purpose of opening a pick-up bed door. The first portion 24 includes a first section 30 and a second section 32 that are rotatably coupled together. Each of a pair of flanges 34 is attached to one of the first 24 and second 26 sections and are positioned generally adjacent to each other. At least one securing member is removably extendable through each of the flanges 34 for preventing rotation of the first section 24 with respect to the second section 26. The securing member preferably comprises two securing members that include a pin 36 and a bolt 38 each extended through the flanges 34. When inserted through aligned openings in the flanges 34, the front sides 20 of the first 24 and second 26 portions are aligned.

A rod 40 for removably receiving a tire 9 is attached to the pole 18 and extends outwardly away from the front side 20 of the pole 18. The rod 40 is positioned on the second portion 26 of the pole 18 and is ideally threaded. A plate 42 has an aperture 44 extending therethrough for removably receiving the rod 40. The aperture 44 is centrally disposed on the plate 42, and the plate 42 has a generally circular shape. The plate 42 has a diameter greater than a diameter of a conventional wheel hub opening. A threaded locking member 46 is selectively positionable on the rod 40. The tire 9 may be positioned on the rod 40, the plate 42 positioned adjacent to the tire 9 and the locking member 46 positioned on the rod 40 for locking the plate 42 in abutment with the tire 9.

A support 48 is attached to the front side 20 of the pole 18 and extends away therefrom. The support 48 is positioned on the second portion 26 and generally adjacent to the break. The support 48 is positioned for supporting a weight of the tire 9 when the tire 9 is positioned on the rod 40. A guard 50 is selectively extended into an upper end of the pole 18. The guard 50 has a bend 52 therein such that the guard 50 extends over the tire 9 when the tire 9 is positioned on the rod 40.

Figure 4:
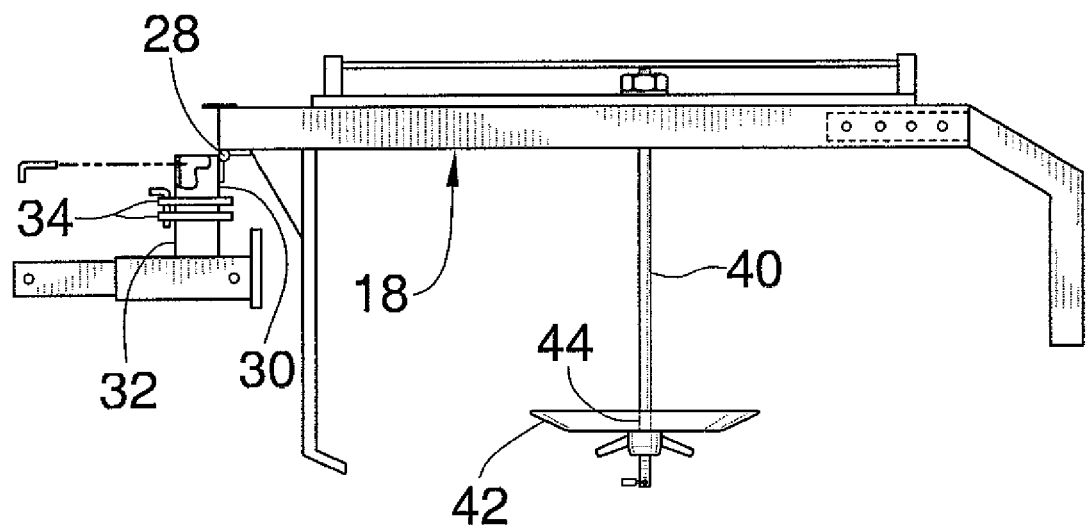
FIG. 4 is a schematic side view of the present invention.

A rigid panel 54 is attached to the back side 22 of the pole 18. The rigid panel 54 acts as a step when the second portion 26 is in a generally horizontal position as shown in FIG. 4. The step is used for retrieving items from a pick-up bed.

In use, the apparatus 10 allows a the owner of a pick-truck to mount a spare tire 9 on a conventional trailer hitch 8 so that the spare tire 9 does not use a large portion of the bed of the pick-up truck. The pole 18 is rotatable to allow for movement of the tire 9 when space is needed due to a trailer being attached to the female hitch coupler 14.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A spare tire holding assembly for selectively attaching to a vehicle receiver hitch, said assembly comprising:
   - a mounting including a male hitch coupler and a female hitch coupler being attached together, wherein said male hitch coupler may be extended into and secured to the receiver hitch such that said female hitch coupler extends away from the receiver hitch;
   - a pole being attached to and extending upwardly from said mounting, said pole having a front side and a back side, said pole having a break therein such that a first portion and a second portion are defined, said first portion abutting said mounting, a hinge hingedly couples said first portion to said second portion, said hinge being positioned on said front side of said pole, said first portion including a first section and a second section being rotatably coupled together;
   - a rod for removably receiving a tire being attached to said pole and extending outwardly away from said front side of said pole, said rod being positioned on said second portion of said pole, said rod being threaded;
   - a threaded locking member being selectively positionable on said rod; and
   - a pair of flanges, each of said flanges being attached to one of said first and second sections and positioned generally adjacent to each other, at least one securing member being removably extendable through each of said flanges for preventing rotation of said first section with respect to said second section.

2. The assembly of claim 1, further including a support being attached to said front side of said pole and extending away therefrom, said support being positioned on said second portion and generally adjacent to said break.

3. The assembly of claim 1, further including a plate having an aperture extending therethrough for removably receiving said rod, said aperture being centrally disposed on said plate, wherein a tire may be positioned on said rod and said plate positioned adjacent to the tire and said locking member positioned on said rod for locking the plate in abutment to the tire.

4. The assembly of claim 3, further including a rigid panel being attached to said back side of said pole.

5. The assembly of claim 1, further including a rigid panel being attached to said back side of said pole.

6. A spare tire holding assembly for selectively attaching to a vehicle receiver hitch, said assembly comprising:
   - a mounting including a male hitch coupler and a female hitch coupler being attached together, wherein said male hitch coupler may be extended into and secured to the receiver hitch such that said female hitch coupler extends away from the receiver hitch;
   - a pole being attached to and extending upwardly from said mounting, said pole having a front side and a back side, said pole having a break therein such that a first portion and a second portion are defined, said first portion abutting said mounting, a hinge hingedly couples said first portion to said second portion, said hinge being positioned on said front side of said pole, said first portion including a first section and a second section being rotatably coupled together;
   - a pair of flanges, each of said flanges being attached to one of said first and second sections and positioned generally adjacent to each other, at least one securing member being removably extendable through each of said flanges for preventing rotation of said first section with respect to said second section;
   - a rod for removably receiving a tire being attached to said pole and extending outwardly away from said front side of said pole, said rod being positioned on said second portion of said pole, said rod being threaded;
   - a support being attached to said front side of said pole and extending away therefrom, said support being positioned on said second portion and generally adjacent to said break;
   - a plate having an aperture extending therethrough for removably receiving said rod, said aperture being centrally disposed on said plate, said plate having a generally circular shape;
   - a threaded locking member being selectively positionable on said rod, wherein a tire may be positioned on said rod and said plate positioned adjacent to the tire and said locking member positioned on said rod for locking the plate in abutment to the tire; and
   - a rigid panel being attached to said back side of said pole.

* * * * *